US012673519B2

(12) United States Patent
Miyazawa

(10) Patent No.: US 12,673,519 B2
(45) Date of Patent: Jul. 7, 2026

(54) TIRE

(71) Applicant: Sumitomo Rubber Industries, Ltd.,
Hyogo (JP)

(72) Inventor: Ken Miyazawa, Kobe (JP)

(73) Assignee: Sumitomo Rubber Industries, Ltd.,
Hyogo (JP)

( * ) Notice: Subject to any disclaimer, the term of this
patent is extended or adjusted under 35
U.S.C. 154(b) by 0 days.

(21) Appl. No.: 18/794,345

(22) Filed: Aug. 5, 2024

(65) Prior Publication Data

US 2025/0074117 A1 Mar. 6, 2025

(30) Foreign Application Priority Data

Sep. 6, 2023 (JP) ................................. 2023-144506

(51) Int. Cl.
B60C 11/11 (2006.01)
B60C 11/03 (2006.01)
(52) U.S. Cl.
CPC ...... B60C 11/0318 (2013.01); B60C 11/0306
(2013.01)
(58) Field of Classification Search
CPC ... B60C 11/0306; B60C 11/0318; B60C 11/11
See application file for complete search history.

(56) References Cited

U.S. PATENT DOCUMENTS 5,178,698 A * 1/1993 Shibata ............... B60C 11/0318
152/209.3
5,178,699 A * 1/1993 Kakumu ................. B60C 11/11
152/902

5,769,990 A 6/1998 Hoffmeister
2012/0145295 A1 * 6/2012 Yamada .................. B60C 11/12
152/209.1
2015/0375571 A1 12/2015 Koishikawa
(Continued)

FOREIGN PATENT DOCUMENTS

EP 0 524 568 A1 1/1993
EP 0890456 B1 * 8/2003 ......... B60C 11/1384
(Continued)

OTHER PUBLICATIONS

English machine translation of JP-2023044037-A. (Year: 2023).*

(Continued)

*Primary Examiner* — Robert C Dye
(74) *Attorney, Agent, or Firm* — Studebaker Brackett
PLLC

(57) ABSTRACT

A tire includes a tread portion having a first land region
provided with first axial grooves and a second land region
provided with second axial grooves. The first axial grooves
are arranged at intervals in a first arrangement over the entire
tire circumference. In the first arrangement, in a pair of
adjacent first axial grooves, a first end of one first axial
groove is located at the same position in the tire circumfer-
ential direction as the second end of the other first axial
groove. The second axial grooves are arranged at intervals in
a second arrangement. The number of types of a second
pitch of the second axial grooves in the second arrangement
is greater than the number of types of a first pitch of the first
axial grooves in the first arrangement.

19 Claims, 5 Drawing Sheets

(56) References Cited

U.S. PATENT DOCUMENTS

2016/0152087 A1 *    6/2016   Hayashi .............. B60C 11/0309
                                             152/209.18
2018/0147891 A1      5/2018   Takahashi

FOREIGN PATENT DOCUMENTS

JP         2022-122121  A      8/2022
JP          2023044037  A   *  3/2023

OTHER PUBLICATIONS

Extended European Search Report issued in EP 24 19 3691.3-1009
by the European Patent Office on Jan. 15, 2025, which is related to
U.S. Appl. No. 18/794,345.

* cited by examiner

TIRE

RELATED APPLICATIONS

This application claims the benefit of foreign priority to Japanese Patent Applications No. JP2023-144506, filed Sep. 6, 2023, which is incorporated by reference in its entirety.

FIELD OF THE INVENTION

The present disclosure relates to a tire.

BACKGROUND OF THE INVENTION

Japanese unexamined patent application publication No. 2022-122121 has proposed a tire in which uneven wear resistance performance and noise performance are improved by specifying the pitch number of axial grooves.

SUMMARY OF THE INVENTION

As vehicles have become quieter in recent years, there is a demand for further improvements in the noise performance of tires as well. As a method for achieving this, it is known to increase the number of different intervals of the axial grooves provided in the tread portion. However, this method may reduce the rigidity of blocks in the tread portion separated by the axial grooves, which may impair steering stability.

The present disclosure was made in view of the above, and a primary object thereof is to provide a tire capable of improving the noise performance while maintaining the steering stability.

The present disclosure is a tire having a tread portion, wherein the tread portion including:

a plurality of circumferential grooves extending continuously in a tire circumferential direction; and a plurality of land regions demarcated by the circumferential grooves, wherein the land regions include a first land region and a second land region adjacent to each other, the first land region is provided with a plurality of first axial grooves extending in a tire axial direction so as to completely cross a ground contacting surface of the first land region, the second land region is provided with a plurality of second axial grooves extending in the tire axial direction so as to completely cross a ground contacting surface of the second land region, each of the first axial grooves includes a first end on one side in the tire axial direction and a second end on the other side in the tire axial direction, the first axial grooves are arranged in a first arrangement over the entire circumference of the tire, in the first arrangement, the first axial grooves are arranged at intervals so that the number (a) of types of a first pitch, which is a distance in the tire circumferential direction between the first axial grooves adjacent to each other in the tire circumferential direction, is one or more over the entire circumference of the tire, in a pair of the first axial grooves adjacent to each other in the tire circumferential direction, a circumferential distance between the first end of one of the first axial grooves and the second end of the other first axial groove is 5% or less of the first pitch of the pair of the first axial grooves or a region obtained by extending parallel to the tire axial direction an opening at the first end of one of the first axial grooves that is open to one of the circumferential grooves adjacent to the first land region on the one side overlaps with an opening at the second end of the other first axial groove that is open to one of the circumferential grooves adjacent to the first land region on the other side, the second axial grooves are arranged in a second arrangement over the entire circumference of the tire, in the second arrangement, the second axial grooves are arranged at intervals so that the number (b) of types of a second pitch, which is a distance in the tire circumferential direction between the second axial grooves adjacent to each other in the tire circumferential direction, is two or more over the entire circumference of the tire, and the number (b) of types of the second pitch is greater than the number (a) of types of the first pitch.

It is possible that the tire of the present disclosure improves the noise performance while maintaining the steering stability by having the configuration described above.

DETAILED DESCRIPTION OF THE INVENTION

Embodiments of the present disclosure will now be described in conjunction with accompanying drawings. The drawings are described inclusive of the features of the present disclosure, but may contain exaggerated expressions or expressions that differ from the actual dimensional ratios of the structure to aid in understanding the present disclosure. Further, throughout the embodiments, identical or common elements are assigned with the same reference signs, and redundant explanations are omitted.

Figure 1:
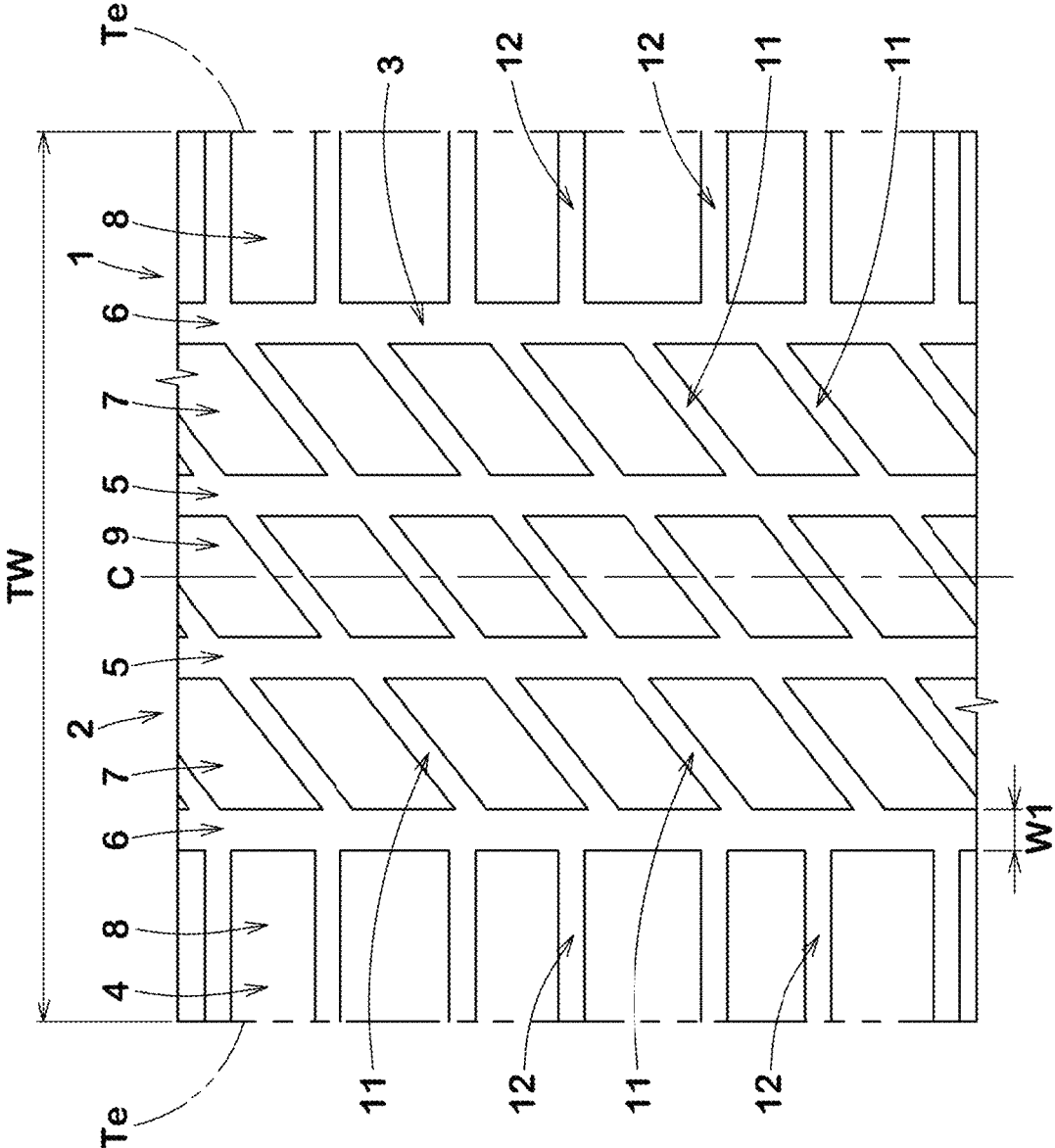
FIG. 1 is a development view of the tread portion of the tire according to an embodiment of the present disclosure.

FIG. 1 is a development view of a tread portion 2 of a tire 1 of the present embodiment in a standard state. As shown in FIG. 1, the tire 1 of the present embodiment is used as a pneumatic tire for passenger cars, for example. The present disclosure may also be implemented as a motorcycle tire or a heavy-duty tire.

In the case of tires for which various standards have been established, the term "standard state" refers to a state in which the tire is mounted on a standard rim, inflated to a standard inner pressure, and loaded with no tire load. In the case of tires for which various standards have not been established or non-pneumatic tires, the standard state means a standard use state according to the purpose of use of the tire and being loaded with no tire load. In the present specification, the dimensions of various parts of the tire are values measured in the standard state unless otherwise noted. Further, known methods can be appropriately used for measuring the above dimensions unless otherwise specified in the present specification.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, the maximum value listed in the "TIRE LOAD LIMITS AT VARIOUS COLD INFLATION PRESSURES" table in TRA, and "INFLATION PRESSURE" in ETRTO.

Tread portion 2 includes two tread edges (Te) and a ground contacting surface demarcated between them. The tread edges (Te) are the axially outermost ground contacting positions of the tire 1 when the tire 1 in the standard state is in contact with a flat surface with zero camber angle by being loaded with 70% of a standard tire load.

In the case of tires for which various standards have been established, the term "standard tire load" refers to a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. In the case of tires for which various standards have not been established, the term "standard tire load" refers to the maximum load that can be applied to the tire in accordance with the above standards.

The tread portion 2 includes a plurality of circumferential grooves 3 extending continuously in the tire circumferential direction between two tread edges (Te), and a plurality of land regions 4 demarcated by these circumferential grooves 3. The circumferential grooves 3 in the present embodiment include two crown circumferential grooves 5 and two shoulder circumferential grooves 6. The two crown circumferential grooves 5 are arranged so as to sandwich the tire equator (C) therebetween. The shoulder circumferential grooves 6 are arranged so that one shoulder circumferential groove 6 is located between the crown circumferential groove 5 and the tread edge (Te) in each axial half of the tread portion 2. Therefore, the two shoulder circumferential grooves 6 are arranged so as to sandwich the tire equator (C) and the two crown circumferential grooves 5 therebetween.

Each of the circumferential grooves 3 has a groove width W1 of 3.0 mm or more, for example, in the range from 3.0% to 6.0% of a tread width TW. The tread width TW corresponds to the distance in the tire axial direction from one tread edge (Te) to the other tread edge (Te) of the tire in the standard state. It is preferred that each of the circumferential grooves 3 has a depth in the range from 5 to 10 mm, for example.

The land regions 4 include first land regions 7 and second land regions 8. In each axial half of the tread portion 2, the first land region 7 and the second land region 8 are adjacent to each other. In each axial half of the tread portion 2 in the present embodiment, the first land region 7 is demarcated between the crown circumferential groove 5 and the shoulder circumferential groove 6. The second land regions 8 is demarcated axially outside the shoulder circumferential groove 6 and includes the tread edge (Te) in each axial half of the tread portion 2 in the present embodiment. Thereby, a pair of the first land region 7 and the second land region 8 is arranged on each side in the tire axial direction in the present embodiment. In addition to these land regions, the land regions 4 in the present embodiment further includes a third land region 9 on the tire equator (C). The third land region 9 has substantially the same configuration as the first land regions 7 described below.

Figure 2:
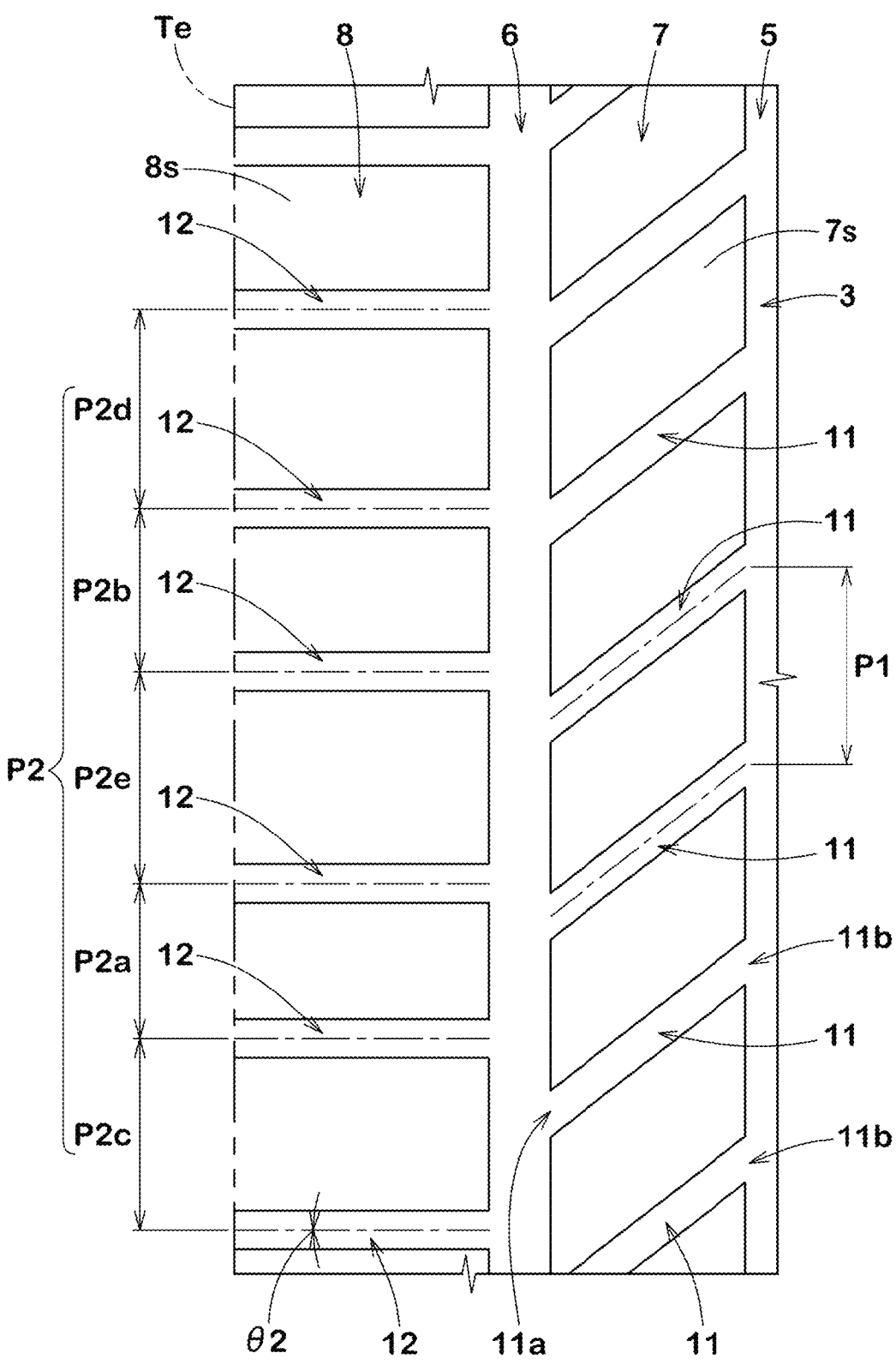
FIG. 2 is an enlarged view of the first land region and the second land region of FIG. 1.

FIG. 2 shows an enlarged view of one of the first land regions 7 and one of the second land regions 8 adjacent thereto. As shown in FIG. 2, each of the first land regions 7 is provided with a plurality of first axial grooves 11. Each of the first axial grooves 11 completely crosses a ground contacting surface (7s) of each of the first land regions 7 in the tire axial direction. Further, each of the second land regions 8 is provided with a plurality of second axial grooves 12. Each of the second axial grooves 12 completely crosses a ground contacting surface (8s) of each of the second land regions 8 in the tire axial direction.

Figure 3:
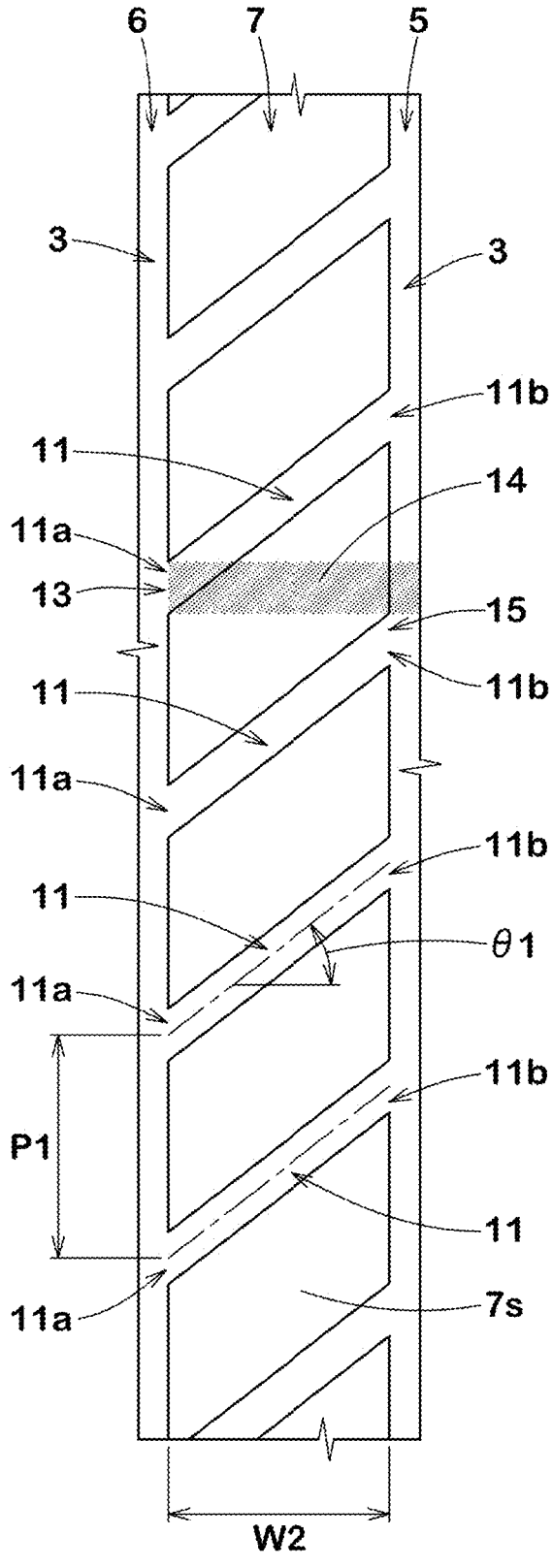
FIG. 3 is an enlarged view of the first land region of FIG. 2.

FIG. 3 shows an enlarged view of one of the first land regions 7. As shown in FIG. 3, each of the first axial grooves 11 includes a first end (11a) on one side (the shoulder circumferential groove 6 side in the present embodiment) in the tire axial direction and a second end (11b) on the other side (the crown circumferential groove 5 side in the present embodiment) in the tire axial direction.

The first axial grooves 11 are arranged in a first arrangement described below over one tire circumference, i.e., over the entire circumference of the tire. In the first arrangement, the first axial grooves 11 are arranged at the same intervals or different intervals so that the number (a) of types of a first pitch P1, which is the distance in the tire circumferential direction between the first axial grooves 11 adjacent to each other in the tire circumferential direction, is one or more over the entire circumference of the tire.

Here, the term "pitch" means the distance in the tire circumferential direction between the groove centerlines of two axial grooves adjacent to each other in the tire circumferential direction. Further, when the two adjacent lateral grooves are non-parallel, the distance means the average distance in the tire circumferential direction weighted by the length of the axial grooves. In other words, when two axial grooves are observed, their arrangement determines a single pitch value.

In the present disclosure, the first axial grooves 11 are arranged so that the first pitch P1 has the number (a) of 1 or more over the entire circumference of the tire. As a preferred embodiment, the number (a) is 1 in the present embodiment. That is, the first axial grooves 11 are arranged at equal intervals in the tire circumferential direction. However, the present disclosure is not limited to such a mode.

Further, in the first arrangement, in a pair of the first axial grooves 11 adjacent to each other in the tire circumferential direction, the first end (11a) of one of the two first axial grooves 11 is located at the same position in the tire circumferential direction as the second end (11b) of the other first axial groove 11. It should be noted that this configuration means that 80% or more of the first axial grooves 11 provided in the first land regions 7 each have the first end (11a) located at the same position in the tire circumferential direction as the second end (11b) of another first axial groove 11. In a preferred embodiment, 90% or more of the first axial grooves 11, and in a more preferred embodiment, all of the first axial grooves 11, have the first ends (11a) and the second ends (11b) in the above arrangement.

Furthermore, "the first end (11a) and the second end (11b) are at the same position in the tire circumferential direction" at least includes an aspect in which, in a plan view of the tread, a region 14 (shaded in FIG. 3 in order to aid understanding) obtained by extending parallel to the tire axial direction an opening 13 open to the circumferential groove 3 (the shoulder circumferential groove 6 in FIG. 3) at the first end (11a) of one of the first axial grooves 11 overlaps with an opening 15 open to the circumferential groove 3 (the crown circumferential groove 5 in FIG. 3) at the second end (11b) of the other first axial groove 11. In addition, from the standpoint of allowing for errors contained in rubber products such as tires, even if the region 14 and the opening 15 do not overlap, the case in which the distance between them in the tire circumferential direction is 5% or less of the first pitch P1 of the pair of the first axial grooves 11 (i.e., the concerned two first axial grooves 11) is considered to meet the feature that "the first end (11a) and the second end (11b) are located at the same position in the tire circumferential direction."

As shown in FIG. 2, the second axial grooves 12 of the present disclosure are arranged in a second arrangement, which will be described below, over the entire circumference of the tire. In the second arrangement, the second axial grooves 12 are arranged at different intervals so that the number (b) of types of a second pitch P2, which is the distance in the tire circumferential direction between the second axial grooves 12 adjacent to each other in the tire circumferential direction, is two or more over the entire circumference of the tire. Moreover, the number (b) of types of the second pitch P2 is greater than the number (a) of types of the first pitch P1.

By having the configuration described above, it is possible that the tire 1 of the present disclosure improves the noise performance while maintaining the steering stability. The reasons for this are as follows.

Conventionally, pitch noise has been known as a type of noise that occurs during running. One of the causes of the pitch noise is impact force generated when the axial grooves come into contact with the road surface. This impact force causes the tread portion and sidewall portions of the tire to vibrate periodically, which can generate the pitch noise. In contrast, in the present disclosure, in a pair of the first axial grooves 11, the first end (11a) of one of the first axial grooves 11 and the second end (11b) of the other first axial groove 11 are arranged at the same position in the tire circumferential direction. Therefore, the first axial grooves 11 can continuously contact with the ground during running, thereby, it is possible that fluctuation in the impact force of the first axial grooves 11 is reduced. Therefore, the pitch noise of the first axial grooves 11 can be reduced and thus the noise performance can be improved.

Further, in the second arrangement of the present disclosure, since the number (b) of types of the second pitch P2 of the second axial grooves 12 is relatively large, the pitch noise of the second axial grooves 12 can be turned into white noise, therefore, further improvement in the noise performance can be expected. Furthermore, in the first arrangement, since the number (a) of types of the first pitch P1 is relatively small, excessive deterioration in pattern rigidity of the first land regions 7 can be suppressed compared to the case where the number of pitch types (hereinafter may be referred to as pitch variation) in each land region is increased. Thereby, the steering stability can be maintained.

A more detailed configuration of the present embodiment will be described below. Each configuration described below represents a specific aspect of the present embodiment. Therefore, it goes without saying that the present disclosure can achieve the above-described effects even if it does not have the configuration described below. Further, even if any one of the configurations described below is applied alone to the tire 1 of the present disclosure having the above-described features, an improvement in performance according to the applied configuration can be expected. Furthermore, when some of the configurations described below are applied in combination, a composite improvement in performance according to the combination can be expected.

As shown in FIG. 1, the first land regions 7 are not located on the tire equator (C) and do not include tread edges (Te). The pattern rigidity of the first land regions 7 configured as such is maintained by the above-described configuration, therefore, it is possible that the steering stability is reliably maintained.

As shown in FIG. 3, the first axial grooves 11 in the present embodiment extend linearly in the tire axial direction with a constant width. The maximum angle θ1 of the first axial grooves 11 with respect to the tire axial direction is in the range from 30 to 50 degrees, for example. However, the first axial grooves 11 are not limited to such a manner.

The number (a) of types of the first pitch P1 is from 1 to 3, for example. In the present embodiment, the number (a) of types of the first pitch P1 is 1, and the first axial grooves 11 having the same shape are arranged at equal intervals in the tire circumferential direction. In another embodiment, when the number (a) of types of the first pitch P1 is 2 or more, groups of the first axial grooves 11 having different angles or shapes may be periodically arranged in the tire circumferential direction. Thereby, improvement in wet performance as well as further improvement in the noise performance can be expected.

The first pitch P1 is in the range from 80% to 120% of a width W2 in the tire axial direction of the ground contacting surface (7s) of each of the first land regions 7, for example. When the number (a) of types of the first pitch P1 is 2 or more, it is preferred that the maximum value of the first pitch P1 is in the range from 80% to 95% of the width W2 of each of the first land regions 7. Moreover, it is preferred that the maximum value of the first pitch P1 is in the range from 105% to 120% of the width W2 of each of the first land regions 7.

As shown in FIG. 1, each of the second land regions 8 includes a respective one of the tread edges (Te). The second land regions 8 configured as such easily transmit the pitch noise to the outside and has a large impact on the noise performance. In the present embodiment, it is expected that the noise performance is further improved by relatively increasing the pitch variation of the land regions including the tread edges (Te).

As shown in FIG. 2, the second axial grooves 12 in the present embodiment extend linearly in the tire axial direction with a constant width. The maximum angle θ2 of the second axial grooves 12 with respect to the tire axial direction is smaller than the maximum angle θ1 of the first axial grooves 11 with respect to the tire axial direction. Specifically, the maximum angle θ2 of the second axial grooves 12 is 10 degrees or less, and is set to zero degrees in the present embodiment.

By setting the angle of the second axial grooves 12 in the above-described manner, two second axial grooves 12 adjacent to each other in the tire circumferential direction do not overlap each other in the tire circumferential direction in the second arrangement of the present embodiment. In other words, a virtual area obtained by extending one of the above-mentioned two second axial grooves 12 in parallel to the tire axial direction does not overlap the other second axial groove 12. Thereby, improvement in anti-wear performance of the second land region 8 can be expected in addition to improvement in the steering stability.

In the present embodiment, the second axial grooves 12 having the same shape are arranged in the tire circumferential direction at different intervals in the tire circumferential direction. However, the present disclosure is not limited to such a mode, and groups of the second axial grooves 12 having different angles and shapes may be periodically arranged in the tire circumferential direction.

The number (b) of types of the second pitch P2 is, for example, from 3 to 5, and is 5 in the present embodiment. In FIG. 2, the second pitch P2 includes pitches denoted by reference signs P2a, P2b, P2c, P2d, and P2e in order from the smallest to the largest length in the tire circumferential direction. The second pitch P2 in the present embodiment includes a pitch or pitches that is/are the same as the first pitch P1 (shown in FIG. 3) (such as P2c), a pitch or pitches that is/are smaller than the first pitch P1 (such as P2a and P2b), and a pitch or pitches that is/are larger than the first pitch P1 (such as P2d and P2e).

It is preferred that the minimum value of the second pitch P2 is smaller than the minimum value of the first pitch P1. Specifically, the minimum value of the second pitch P2 is in the range from 70% to 90% of the minimum value of the first pitch P1. Therefore, the frequency band of the pitch noise generated by the second axial grooves 12 is expanded, thereby, the noise performance can be further improved while the steering stability is maintained.

It is preferred that the maximum value of the second pitch P2 is greater than the maximum value of the first pitch P1. Specifically, the maximum value of the second pitch P2 is in the range from 105% to 120% of the maximum value of the first pitch P1. Therefore, the steering stability and the noise performance are improved in a good balance.

From the same point of view, it is preferred that the total number N2 of the second axial grooves 12 provided in the second land regions 8 is greater than the total number N1 of the first axial grooves 11 provided in the first land regions 7. Specifically, it is preferred that the total number N2 is in the range from 105% to 120% of the total number N1.

Figure 4:
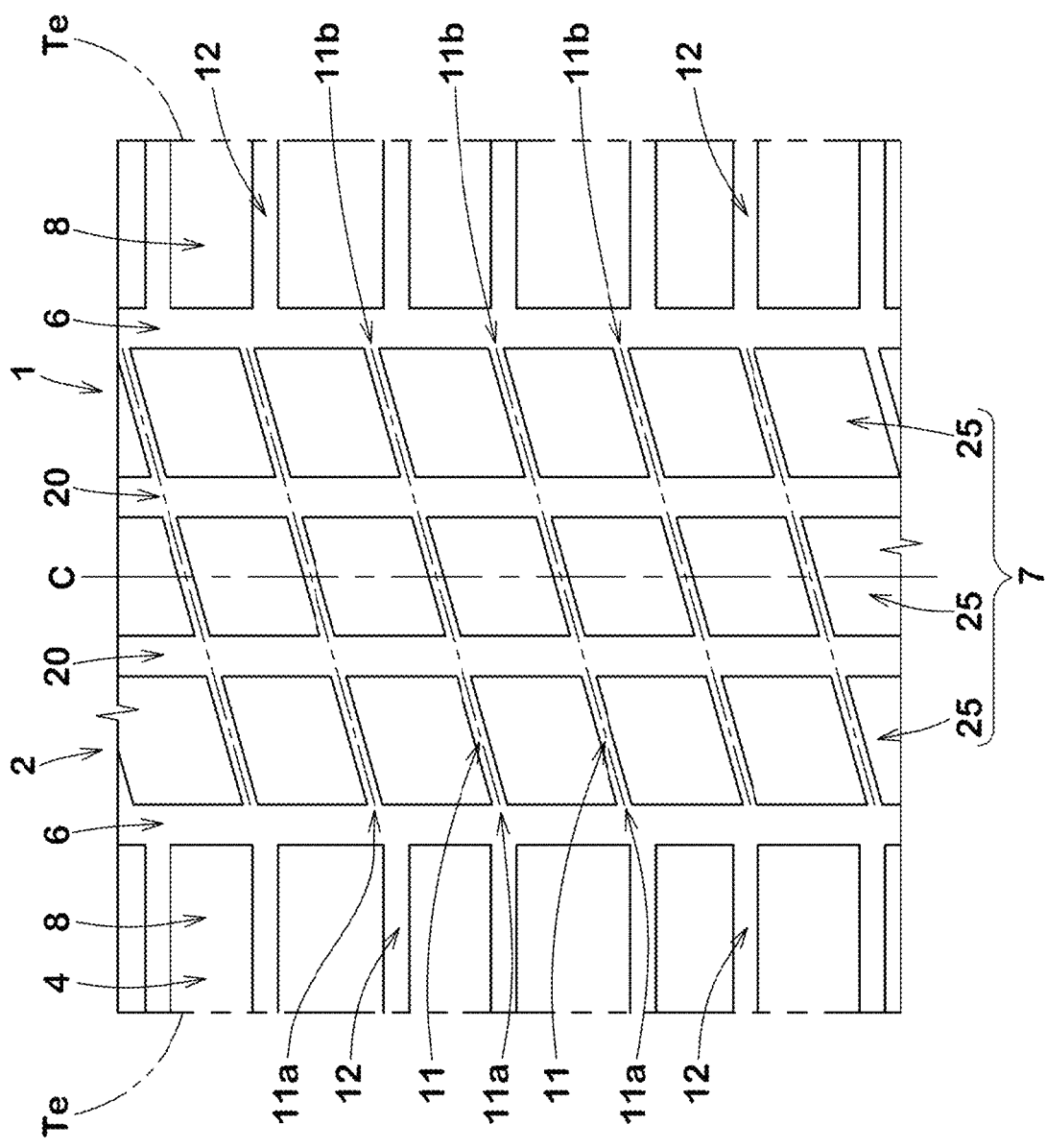
FIG. 4 is a development view of the tread portion of the tire according to another embodiment of the present disclosure.

FIG. 4 shows a development view of the tread portion 2 of the tire 1 according to another embodiment of the present disclosure. In this embodiment, one first land region 7 is defined between two shoulder circumferential grooves 6. In other words, the first land region 7 in this embodiment includes three block rows 25 which will be described later. Further, this first land region 7 is provided with a plurality of first axial grooves 11 each extending from one of the shoulder circumferential grooves 6 to the other shoulder circumferential groove 6, and the first axial grooves 11 are arranged in the above-mentioned first arrangement over the entire circumference of the tire. Even in this configuration, the noise performance can be improved while the steering stability is maintained through the mechanism described above.

The first land region 7 in this embodiment is provided with one or more longitudinal grooves 20 that cross the multiple first axial grooves 11 in the tire circumferential direction. The longitudinal grooves 20 may extend continuously in the tire circumferential direction and may have substantially the same configuration as the crown circumferential grooves 5 shown in FIG. 1. In this embodiment, the longitudinal grooves 20 extend continuously in the tire circumferential direction over the entire circumference of the tire, thereby, the first land region 7 is divided into three block rows 25. In this embodiment, the above-mentioned first axial grooves 11 and the longitudinal grooves 20 improve the noise performance while ensuring the wet performance.

While detailed description has been made of the tire according to embodiments of the present disclosure, the present disclosure can be embodied in various forms without being limited to the illustrated embodiments.

Examples

Figure 5:
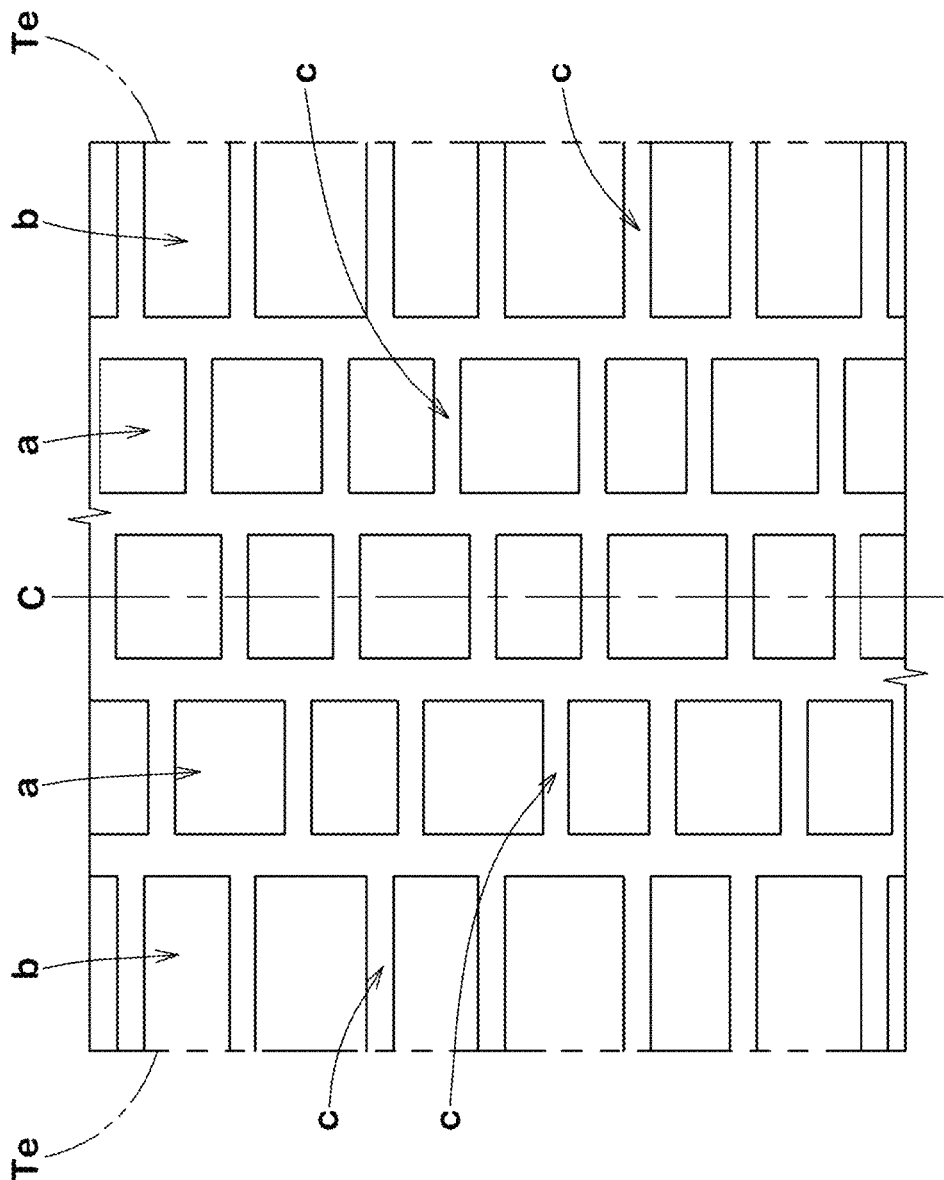
FIG. 5 is a development view of the tread portion of the tire in Reference.

Pneumatic tires of size 195/65R15 having a tread portion as shown in FIG. 1 or FIG. 4 (tire rim: 15×6.0; tire inner pressure: 250 kPa) were made by way of test as tires in Examples 1 and 2. Tires having the tread portion shown in FIG. 5 were made by way of test as tires in Reference. As shown in FIG. 5, each of the first land regions (a) and the second land regions (b) of the tires in the Reference is provided with axial grooves (c) extending parallel to the tire axial direction and arranged so as to have the same pitch variation. The tires in the Reference are substantially the same as the tires in the Examples except for the above points. These test tires were tested for the steering stability and the noise performance. The test methods were as follows.

<Noise Performance>

Noise was measured when each test tire was run on a drum testing machine under conditions of a vertical load of 4.51 kN and at a speed from 40 to 100 km/h. The results are expressed as an index with the reciprocal of the sound pressure of the noise in the Reference being 100, wherein the larger the numerical value, the smaller the noise is, which indicates superior noise performance.

<Steering Stability>

While a test driver drove a test vehicle (front-wheel drive vehicle with displacement of 2000 cc) with the test tires mounted thereon on a dry road surface, the steering stability was evaluated by the test driver's sensory perception. The results are indicated as an evaluation point based on the Reference being 100, wherein the larger the numerical value, the better the steering stability is.

The test results are shown in Table 1.

TABLE 1

|  | Reference | Example 1 | Example 2 |
|---|---|---|---|
| FIG. showing Tread pattern | FIG. 5 | FIG. 1 | FIG. 4 |
| Noise performance [index] | 100 | 130 | 115 |
| Steering stability [evaluation point] | 100 | 100 | 100 |

As shown in Table 1, it was confirmed that the tires in the Examples improved the noise performance while maintaining the steering stability.

[Statement of Disclosure]

The present disclosure includes the following aspects.

[Present Disclosure 1]

A tire having a tread portion, wherein the tread portion including:

a plurality of circumferential grooves extending continuously in a tire circumferential direction; and a plurality of land regions demarcated by the circumferential grooves, wherein the land regions include a first land region and a second land region adjacent to each other, the first land region is provided with a plurality of first axial grooves extending in a tire axial direction so as to completely cross a ground contacting surface of the first land region, the second land region is provided with a plurality of second axial grooves extending in the tire axial direction so as to completely cross a ground contacting surface of the second land region, each of the first axial grooves includes a first end on one side in the tire axial direction and a second end on the other side in the tire axial direction, the first axial grooves are arranged in a first arrangement over the entire circumference of the tire, in the first arrangement, the first axial grooves are arranged at intervals so that the number (a) of types of a first pitch, which is a distance in the tire circumferential direction between the first axial grooves adjacent to each other in the tire circumferential direction, is one or more over the entire circumference of the tire, in a pair of the first axial grooves adjacent to each other in the tire circumferential direction, a circumferential distance between the first end of one of the first axial grooves and the second end of the other first axial groove is 5% or less of the first pitch of the pair of the first axial grooves or a region obtained by extending parallel to the tire axial direction an opening at the first end of one of the first axial grooves that is open to one of the circumferential grooves adjacent to the first land region on the one side overlaps with an opening at the second end of the other first axial groove that is open to one of the circumferential grooves adjacent to the first land region on the other side, the second axial grooves are arranged in a second arrangement over the entire circumference of the tire, in the second arrangement, the second axial grooves are arranged at intervals so that the number (b) of types of a second pitch, which is a distance in the tire circumferential direction between the second axial grooves adjacent to each other in the tire circumferential direction, is two or more over the entire circumference of the tire, and the number (b) of types of the second pitch is greater than the number (a) of types of the first pitch.

[Present Disclosure 2]

The tire according to Present Disclosure 1, wherein a minimum value of the second pitch is smaller than a minimum value of the first pitch.

[Present Disclosure 3]

The tire according to Present Disclosure 1 or 2, wherein a maximum value of the second pitch is greater than a maximum value of the first pitch.

[Present Disclosure 4]

The tire according to any one of Present Disclosures 1 to 3, wherein the number (a) of types of the first pitch is from 1 to 3.

[Present Disclosure 5]

The tire according to any one of Present Disclosures 1 to 4, wherein the number (b) of types of the second pitch is from 3 to 5.

[Present Disclosure 6]

The tire according to any one of Present Disclosures 1 to 5, wherein a total number of the second axial grooves provided in the second land region is greater than a total number of the first axial grooves provided in the first land region.

[Present Disclosure 7]

The tire according to any one of Present Disclosures 1 to 6, wherein two second axial grooves adjacent to each other in the tire circumferential direction do not overlap each other in the tire circumferential direction in the second arrangement.

[Present Disclosure 8]

The tire according to any one of Present Disclosures 1 to 7, wherein a maximum angle of the second axial grooves with respect to the tire axial direction is smaller than a maximum angle of the first axial grooves with respect to the tire axial direction.

[Present Disclosure 9]

The tire according to any one of Present Disclosures 1 to 8, wherein the first land region is provided with one or more longitudinal grooves crossing the first axial grooves in the tire circumferential direction.

DESCRIPTION OF REFERENCE SIGNS

2 tread portion
3 circumferential groove
4 land region
7 first land region
8 second land region
11 first axial groove
12 second axial groove
11$a$ first end
11$b$ second end
P1 first pitch
P2 second pitch
a number of types of first pitch
b number of types of second pitch

The invention claimed is:

1. A tire having a tread portion, wherein the tread portion comprises:

a plurality of circumferential grooves extending continuously in a tire circumferential direction; and a plurality of land regions demarcated by the circumferential grooves, wherein the land regions include a first land region and a second land region adjacent to each other, the first land region is provided with a plurality of first axial grooves extending in a tire axial direction so as to completely cross a ground contacting surface of the first land region, the second land region is provided with a plurality of second axial grooves extending in the tire axial direction so as to completely cross a ground contacting surface of the second land region, each of the first axial grooves includes a first end on one side in the tire axial direction and a second end on the other side in the tire axial direction, the first axial grooves are arranged in a first arrangement over the entire circumference of the tire, in the first arrangement, the first axial grooves are arranged at intervals so that the number (a) of types of a first pitch, which is a distance in the tire circumferential direction between the first axial grooves adjacent to each other in the tire circumferential direction, is one or more over the entire circumference of the tire, in a pair of the first axial grooves adjacent to each other in the tire circumferential direction, a circumferential distance between the first end of one of the first axial grooves and the second end of the other first axial groove is 5% or less of the first pitch of the pair of the first axial grooves or a region obtained by extending parallel to the tire axial direction an opening at the first end of one of the first axial grooves that is open to one of the circumferential grooves adjacent to the first land region on the one side overlaps with an opening at the second end of the other first axial groove that is open to one of the circumferential grooves adjacent to the first land region on the other side, the second axial grooves are arranged in a second arrangement over the entire circumference of the tire, in the second arrangement, the second axial grooves are arranged at intervals so that the number (b) of types of a second pitch, which is a distance in the tire circumferential direction between the second axial grooves adjacent to each other in the tire circumferential direction, is two or more over the entire circumference of the tire, and the number (b) of types of the second pitch is greater than the number (a) of types of the first pitch, and wherein the first pitch is in the range from 80% to 120% of a width in the tire axial direction of the ground contacting surface of the first land region.

2. The tire according to claim 1, wherein a minimum value of the second pitch is smaller than a minimum value of the first pitch.

3. The tire according to claim 1, wherein a maximum value of the second pitch is greater than a maximum value of the first pitch.

4. The tire according to claim 3, wherein the maximum value of the second pitch is in the range from 105% to 120% of the maximum value of the first pitch.

5. The tire according to claim 1, wherein the number (a) of types of the first pitch is from 1 to 3.

6. The tire according to claim 5, wherein the number (a) of types of the first pitch is 1, and the first axial grooves having the same shape are arranged at equal intervals in the tire circumferential direction.

7. The tire according to claim 5, wherein the number (a) of types of the first pitch is 2 or more, and groups of the first axial grooves having different angles with respect to the tire axial direction and/or different shapes may be periodically arranged in the tire circumferential direction.

8. The tire according to claim 1, wherein the number (b) of types of the second pitch is from 3 to 5.

9. The tire according to claim 8, wherein the number (b) of types of the second pitch is 5.

10. The tire according to claim 8, wherein the second pitch includes a pitch same as the first pitch, a pitch smaller than the first pitch, and a pitch larger than the first pitch.

11. The tire according to claim 1, wherein a total number of the second axial grooves provided in the second land region is greater than a total number of the first axial grooves provided in the first land region.

12. The tire according to claim 11, wherein the total number of the second axial grooves is in the range from 105% to 120% of the total number of the first axial grooves.

13. The tire according to claim 1, wherein two second axial grooves adjacent to each other in the tire circumferential direction do not overlap each other in the tire circumferential direction in the second arrangement.

14. The tire according to claim 1, wherein a maximum angle of the second axial grooves with respect to the tire axial direction is smaller than a maximum angle of the first axial grooves with respect to the tire axial direction.

15. The tire according to claim 14, wherein the maximum angle of the second axial grooves is 10 degrees or less.

16. The tire according to claim 1, wherein the first land region is provided with one or more longitudinal grooves crossing the first axial grooves in the tire circumferential direction.

17. The tire according to claim 1, wherein a maximum angle θ1 of the first axial grooves with respect to the tire axial direction is in the range from 30 to 50 degrees.

18. The tire according to claim 1, wherein the minimum value of the second pitch is in the range from 70% to 90% of the minimum value of the first pitch.

19. A tire having a tread portion, wherein the tread portion comprises:

a plurality of circumferential grooves extending continuously in a tire circumferential direction; and a plurality of land regions demarcated by the circumferential grooves, wherein the land regions include a first land region and a second land region adjacent to each other, the first land region is provided with a plurality of first axial grooves extending in a tire axial direction so as to completely cross a ground contacting surface of the first land region, the second land region is provided with a plurality of second axial grooves extending in the tire axial direction so as to completely cross a ground contacting surface of the second land region, each of the first axial grooves includes a first end on one side in the tire axial direction and a second end on the other side in the tire axial direction, the first axial grooves are arranged in a first arrangement over the entire circumference of the tire, in the first arrangement, the first axial grooves are arranged at intervals so that the number (a) of types of a first pitch, which is a distance in the tire circumferential direction between the first axial grooves adjacent to each other in the tire circumferential direction, is one or more over the entire circumference of the tire, in a pair of the first axial grooves adjacent to each other in the tire circumferential direction, a circumferential distance between the first end of one of the first axial grooves and the second end of the other first axial groove is 5% or less of the first pitch of the pair of the first axial grooves or a region obtained by extending parallel to the tire axial direction an opening at the first end of one of the first axial grooves that is open to one of the circumferential grooves adjacent to the first land region on the one side overlaps with an opening at the second end of the other first axial groove that is open to one of the circumferential grooves adjacent to the first land region on the other side, the second axial grooves are arranged in a second arrangement over the entire circumference of the tire, in the second arrangement, the second axial grooves are arranged at intervals so that the number (b) of types of a second pitch, which is a distance in the tire circumferential direction between the second axial grooves adjacent to each other in the tire circumferential direction, is two or more over the entire circumference of the tire, and the number (b) of types of the second pitch is greater than the number (a) of types of the first pitch, wherein a maximum value of the second pitch is greater than a maximum value of the first pitch, and wherein the maximum value of the first pitch is in the range from 105% to 120% of an axial width of the ground contacting surface of the first land region.

* * * * *